US010648685B2

(12) United States Patent
Cho et al.

(10) Patent No.: US 10,648,685 B2
(45) Date of Patent: May 12, 2020

(54) NETWORK ACCESS APPARATUS AND METHOD FOR INDOOR ENVIRONMENT MONITORING OF THE SAME

(71) Applicant: CENTER FOR INTEGRATED SMART SENSORS FOUNDATION, Yuseong-gu, Daejeon (KR)

(72) Inventors: Hyun Tae Cho, Daejeon (KR); Chong Min Kyung, Daejeon (KR)

(73) Assignee: CENTER FOR INTEGRATED SMART SENSORS FOUNDATION, Yuseong-Gu, Daejeon (KR)

(*) Notice: Subject to any disclaimer, the term of this patent is extended or adjusted under 35 U.S.C. 154(b) by 204 days.

(21) Appl. No.: 15/691,166

(22) Filed: Aug. 30, 2017

(65) Prior Publication Data

US 2019/0063771 A1 Feb. 28, 2019
US 2019/0353365 A9 Nov. 21, 2019

(30) Foreign Application Priority Data

Sep. 8, 2016 (KR) .................... 10-2016-0115888

(51) Int. Cl.
*G05B 19/00* (2006.01)
*F24F 11/30* (2018.01)
(Continued)

(52) U.S. Cl.
CPC .............. *F24F 11/30* (2018.01); *F24F 11/52* (2018.01); *F24F 11/58* (2018.01); *H04W 84/18* (2013.01);
(Continued)

(58) Field of Classification Search
CPC .. F24F 11/30; F24F 11/58; F24F 11/52; F24F 2110/50; F24F 2110/10; F24F 2110/20; G06N 20/00; H04W 84/18
See application file for complete search history.

(56) References Cited

U.S. PATENT DOCUMENTS

2006/0060004 A1* 3/2006 Desrochers .............. G01N 1/22
73/863.71
2006/0234621 A1* 10/2006 Desrochers ............. F24F 3/044
454/239

(Continued)

FOREIGN PATENT DOCUMENTS

KR 10-2015-0112285 A 10/2015
KR 10-2016-0074829 A 6/2016

OTHER PUBLICATIONS

Office Action received for Korean Patent Application No. 10-2016-0115888, dated Jan. 2, 2018, 9 pages (4 pages of English Translation and 5 pages of Office Action).

*Primary Examiner* — Michael D Masinick
(74) *Attorney, Agent, or Firm* — Womble Bond Dickinson (US) LLP

(57) ABSTRACT

The present disclosure relates to a piece of network access apparatus for indoor environment monitoring and a method for indoor environment monitoring of the network access apparatus. The present disclosure also relates to a network access apparatus for indoor environment monitoring and a method for indoor environment monitoring of the network access apparatus so that network access apparatus installed indoors (e.g. in the house, in the office, in a building) additionally take an action of monitoring indoor environment. The network access apparatus includes a network connection performer to support at least a communication terminal's connection to an external network, relay a data communication between the communication terminal and the external network, and obtain and provide information on a history of network connections per communication terminal, an indoor environment monitoring unit to sense and inform indoor environment via a plurality of indoor environment sensors, infer a user situation based on the history of network connections per communication terminal, and (Continued)

control each sensing cycle of the plurality of indoor environment sensors based on the user situation, and a power supplier to generate and provide an operating power of the network connection performer and the indoor environment monitoring unit.

22 Claims, 8 Drawing Sheets

(51) Int. Cl.
| | | |
|---|---|---|
| *F24F 11/52* | (2018.01) | |
| *F24F 11/58* | (2018.01) | |
| *H04W 84/18* | (2009.01) | |
| *F24F 110/20* | (2018.01) | |
| *F24F 110/50* | (2018.01) | |
| *F24F 110/10* | (2018.01) | |
| *G06N 20/00* | (2019.01) | |

(52) U.S. Cl.
CPC ....... *F24F 2110/10* (2018.01); *F24F 2110/20* (2018.01); *F24F 2110/50* (2018.01); *G06N 20/00* (2019.01)

(56) References Cited

U.S. PATENT DOCUMENTS

| 2014/0274225 | A1* | 9/2014 | Lacatus | H04W 24/08 |
| | | | | 455/574 |
| 2014/0285113 | A1* | 9/2014 | Huang | H05B 37/0272 |
| | | | | 315/297 |
| 2016/0011053 | A1* | 1/2016 | Katz | G01J 5/025 |
| | | | | 250/338.3 |
| 2016/0334320 | A1* | 11/2016 | Cho | G01N 15/06 |
| 2017/0193788 | A1* | 7/2017 | Kim | G08B 21/12 |
| 2018/0145844 | A1* | 5/2018 | Pera | H04M 1/72533 |
| 2019/0063771 | A1* | 2/2019 | Cho | H04W 84/18 |
| 2019/0353365 | A9* | 11/2019 | Cho | F24F 11/52 |

* cited by examiner

NETWORK ACCESS APPARATUS AND METHOD FOR INDOOR ENVIRONMENT MONITORING OF THE SAME

CROSS-REFERENCE TO RELATED APPLICATIONS

This application claims the benefit under 35 USC 119(a) of Korean Patent Application No. 10-2016-0115888 filed on Sep. 8, 2016 in the Korean Intellectual Property Office, the entire disclosure of which is incorporated herein by reference for all purposes.

BACKGROUND

1. Field

The following description relates to an indoor environment sensing technique. The following description relates to a network access apparatus and a method for monitoring an indoor environment of the apparatus that is capable of performing the operation of monitoring the indoor environment via the network access apparatus installed indoors, for example, in the house, in the office, in a building.

2. Description of Related Art

In general, it is common that the quality of indoor air is worse than that of outdoor air. That is because a lot of pollutants, such as the dust rising from the people walking indoors, the volatile organic compounds emitted from wallpapers or furniture, etc., are created. In particular, pollutants that are created in the kitchen are highly dangerous and numerous. In consideration of these environments, devices that can monitor the quality of indoor or outdoor air are launched recently. These devices transfer the information on air quality to a user's smart phone or on the Internet through a wireless network.

On the other hand, a demand for home network has been increased by the improvement in networking technique, infrastructure software, and information home appliances, by the change in domestic telecommunication and infrastructure environment, and by the increased users' desire for intellectual home networking. As a result, a lot of households and public places are using the access points and routers.

At present, in order to meet those needs, extra devices are necessary and protocols for connection of the devices become more complex. In addition, there is the problem that more and more money and power are consumed as more devices are needed.

SUMMARY

This Summary is provided to introduce a network access apparatus for monitoring an indoor environment that includes a communication unit that supports a connection between a communication terminal and an external network, a communication controller that relays a data communication between the communication terminal and the external network and also monitors whether there is a communication terminal that is connected to the communication unit or a type of the communication terminal, a sensing unit that equips a plurality of indoor environment sensors, an indoor environment monitoring unit that controls each sensing cycle of the plurality of indoor environment sensors based on a result of monitoring of the communication controller and, then, that generates and outputs a piece of indoor environment information via the plurality of indoor environment sensors whose each sensing cycle is adjusted, and a power supply unit that generates and supplies an operating power of the communication controller, the indoor environment monitoring unit, and the sensing unit. The term 'indoor environment information' refers to the information on indoor environment. The communication controller transfers the indoor environment information of the indoor environment monitoring unit to a user or an external device.

The indoor environment monitoring unit groups the plurality of indoor environment sensors into a plurality of groups and controls each sensing cycle of the plurality of indoor environment sensors by group.

The indoor environment monitoring unit turns off all the plurality of indoor environment sensors and increases the each sensing cycle to a predetermined value if there is no communication terminal that is connected to the communication unit or if no connection of communication terminal is made within a predetermined time period.

It is possible that each sensing cycle of the plurality of indoor environment sensors is learned by Machine Learning or Deep Learning.

The communication controller also connects to a predetermined cloud server and uploads the indoor environment information of the indoor environment monitoring unit to the predetermined cloud server.

The communication controller also shares the indoor environment information of the indoor environment monitoring unit with the communication terminal that is connected to the communication unit.

The communication controller also calculates and provides, based on the indoor environment information and a result of the monitoring of the communication controller, an amount of exposure to pollutants for each user visiting a place in which the network access apparatus is installed, to the user.

The network access apparatus also includes a data input output unit that audio-visually provides information on an operation status of the communication controller and the indoor environment information of indoor environment monitoring unit via at least one of a display panel, a light-emitting diode, and a speaker.

In this case, the data input output unit also receives a manual input of a user control value via at least one of a button, a switch, a scrollbar, and a touch indoor environment sensor. If the user control value is inputted via the data input output unit, the indoor environment monitoring unit further controls each sensing cycle of the plurality of indoor environment sensors based on the user control value.

The user control value is one of a sensor control value, a user situation, and an indoor environment sensor operating schedule.

The network access apparatus is one of a wireless router, a wired router, an access point, and a set-top box.

The sensing unit and the indoor environment monitoring unit are implemented as a Universal Serial Bus (USB) Dongle that is capable of being connected to a wired port formed in one of the wireless router, the access point, and the set-top box.

In order to solve the above-mentioned problem, another example according to the present disclosure is provided to introduce a network access apparatus for indoor environment monitoring including a communication unit that supports a connection between a communication terminal and an external network, a sensing unit that equips a plurality of indoor environment sensors, a controller that relays a data communication between the communication terminal and the external network, monitors whether there is a communication terminal that is connected to the communication unit or a type of the communication terminal and, then, that controls each sensing cycle of the plurality of indoor environment sensors based on a result of the monitoring, and that generates and outputs indoor environment information via the plurality of indoor environment sensors whose each sensing cycle is adjusted, and a power supply unit that generates and supplies an operating power of the controller and the sensing unit.

The controller groups the plurality of indoor environment sensors into a plurality of groups and controls the each sensing cycle of the plurality of indoor environment sensors by group.

The indoor environment monitoring unit that turns off all the plurality of indoor environment sensors or increases the each sensing cycle to a predetermined value if there is no communication terminal that is connected to the communication unit or if no connection of communication terminal is made within a predetermined time period.

The each sensing cycle of the plurality of indoor environment sensors may be learned by Machine Learning or Deep Learning.

The controller also connects to a predetermined cloud server and uploads the indoor environment to the predetermined cloud server.

The controller also shares the indoor environment information with a communication terminal connected to the communication unit.

The controller also calculates and provides, based on the information on whether there is a communication terminal that is connected to the communication unit or a type of the communication terminal and the indoor environment information, an amount of exposure to pollutants for each user visiting a place in which the network access apparatus is installed.

The network access apparatus further includes a data input output unit that audio-visually provides information on an operation status of the communication controller and the indoor environment information of the indoor environment monitoring unit via at least one of a display panel, a light-emitting diode, and a speaker.

The data input output unit receives a manual input of a user control value via at least one of a button, a switch, a scrollbar, and a touch indoor environment sensor. If the user control value is inputted via the data input output unit, the controller also controls each sensing cycle of the plurality of indoor environment sensors based on the user control value.

The user control value is one of a sensor control value, a user situation, and an indoor environment sensor operating schedule.

The network access apparatus is one of a wireless router, a wired router, an access point, and a set-top box.

In order to solve the above-mentioned problem, another example according to the present disclosure is provided to introduce a method for indoor environment monitoring of network access apparatus that includes relaying a data communication between a communication terminal and an external network and monitoring whether there is a communication terminal that is connected to the communication unit or a type of the communication terminal, adjusting each sensing cycle of a plurality of indoor environment sensors based on whether there is a communication terminal or the type of the communication terminal, and sensing and informing an indoor environment via the plurality of indoor environment sensors whose each sensing cycle is adjusted.

DETAILED DESCRIPTION

Figure 1:
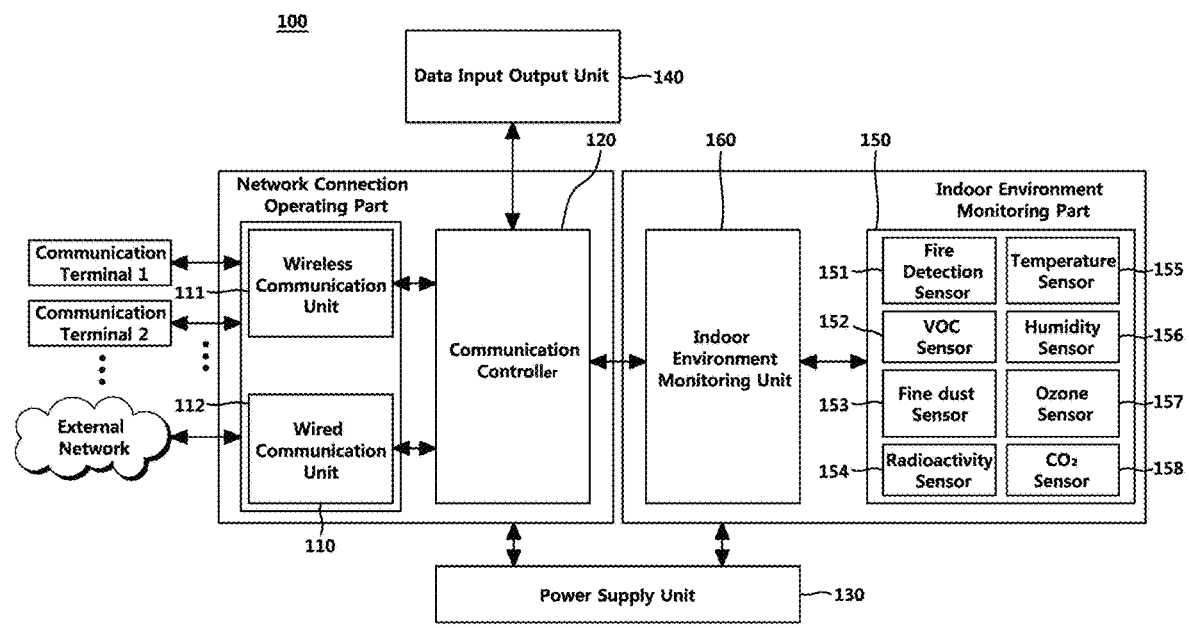
FIG. 1 is a diagram illustrating a network access apparatus according to an example of the present disclosure.

Technical terms used in the present disclosure are merely used for explanation of specific examples and are not suggestive of limitation. In addition, the used technical terms shall be interpreted as a meaning generally understood by a person having ordinary skill in the art and not as an excessively comprehensive or excessively reduced meaning unless they are defined as a different meaning in the present disclosure. In addition, if the technical terms are a term that does not exactly express the concept of the present disclosure, it should be replaced with another term to be correctly interpreted by the person having ordinary skill in the art. In addition, general terms used in the following description are interpreted as defined in dictionary or based on the context and are not interpreted as an excessively reduced meaning.

In addition, an expression of singular form means to include a plural type unless expressly specified otherwise. In the present disclosure, the terms "comprise," "include" variations thereof are not interpreted to mean that every component or step described in the following description has to be included and are interpreted to mean that some components or steps may not be included or additional components or steps may be added.

The present disclosure provides a network access apparatus and a method for monitoring an indoor environment thereof wherein the network access apparatus installed indoors (e.g. in the house, in the office, in a building) further performs an operation of monitoring indoor environment.

In addition, the present disclosure provides a network access apparatus and a method for indoor environment monitoring thereof wherein each sensing cycle of a plurality of indoor environment sensors is frequently adjusted based on user situations and other things so that the power consumption of the plurality of indoor environment sensors is minimized.

Hereinafter, examples of the present disclosure are described in detail with reference to the accompanying drawings. The same reference numerals are given to the same or similar elements regardless of symbols illustrated in drawings and repeated description is omitted.

Descriptions of well-known components and processing techniques may be omitted so as to not unnecessarily obscure the embodiments of the disclosure. The accompanying drawings are intended merely to facilitate an understanding of ways in which the disclosure may be practiced and to further enable those of skill in the art to practice the embodiments of the disclosure. Accordingly, the drawings should not be construed as limiting the scope of the disclosure.

FIG. 1 is a diagram illustrating a network access apparatus according to an example of the present disclosure.

As illustrated in FIG. 1, a network access apparatus 100 may support an external network connection of a communication terminal located indoors (in the house, in the office, in a building, etc.) such as a wireless router, a wired router, an access point, and a set-top box. The network access apparatus 100 may further include an indoor environment monitoring part as well as a network connection operating part. In detail, in addition to a communication unit 110, a communication controller 120, a power supply unit 130, and a data input output unit 140, the network access apparatus 100 may further include a sensing unit 150 and an indoor environment monitoring unit 160.

The communication unit 110 may include a wireless communication unit 111 and a wired communication unit 112. The communication unit 110 may support a wireless connection between a communication terminal and an external network via the wireless communication unit 111 and support a wired connection between a communication terminal and an external network via the wired communication unit 112.

The communication controller 120 may relay data communication between a communication terminal that is connected to the communication unit 110 and an external network and monitor whether there is a communication terminal which is connected to the communication unit 110, or the type of the communication terminal.

The sensing unit 150 may include a plurality of indoor environment sensors 151 to 158 to sense the indoor environment of a place in which the network access apparatus 100 is installed (for example, whether a fire breaks out, and the information on Volatile Organic Compound (VOC), fine dust, degrees of radioactivity, temperature, humidity, ozone, and carbon dioxide ($CO_2$), etc.). The indoor environment sensors 151 to 158 may be implemented as a fire detection sensor 151, a VOC sensor 152, a fine dust sensor 153, a radioactivity sensor 154, a temperature sensor 155, a humidity sensor 156, an ozone sensor 157, and a $CO_2$ sensor 158.

The indoor environment monitoring unit 160 may receive and analyze results of sensing the operations of a plurality of indoor environment sensors 151 to 158 and then generate and output a piece of indoor environment information. The term 'indoor environment information' refers to the information on indoor environment. In addition, the indoor environment monitoring unit 160 may receive information on whether there is a communication terminal that is connected to the communication unit 110 or the type of the communication terminal and may control each sensing cycle of the plurality of indoor environment sensors based on the information. The indoor environment monitoring unit 160 may also generate information on the indoor environment based on a sensing result of operations of the plurality of indoor environment sensors.

Compared to the indoor environment sensors of the present disclosure, other sensors for sensing the indoor environment mainly consist of chemical sensors producing and outputting a signal in response to chemical reactions, and these sensors have a heater to keep their temperature above a specific temperature, which leads to a relatively higher power consumption.

The place in which a network access apparatus is installed is an area which a user lives in or commutes to and from, so the situation of a user occurring indoors may vary depending on what time it is and who the user is. For example, there may be the following user situations: the situation in which there is no user indoors, the situation in which a user watches TV indoors, the situation in which a user cooks indoors, the situation in which a user takes a sleep. The pattern of change in indoor environment may vary depending on every user situation. The user situation may be inferred by the type of communication terminal that is carried with and used by the user.

The indoor environment monitoring unit 160 according to an example of the present disclosure enables a current situation of user to be inferred by receiving and analyzing information on whether there is any communication terminal that is connected to the communication unit 110 or on the type of the communication terminal, which is basically monitored and managed by the communication controller 120.

A power consumption resulting from the operation of indoor environment sensor is in advance prevented from unnecessarily being increased by changing each sensing cycle of a plurality of indoor environment sensors 151 to 158 based on the user situation In particular, if there is no communication terminal connected to the communication unit 110 or if no connection history of communication terminal is made within a predetermined time period, the indoor environment monitoring unit 160 may turn off all the plurality of indoor environment sensors or increase their sensing cycles to predetermined values.

The indoor environment monitoring unit 160 may also audio-visually provide a user with information on a result of sensing the indoor environment by directly controlling operations of the data input output unit 140 or by providing the communication controller 120 with the result so that the communication controller 120 is able to audio-visually provide the result to the user.

In addition, the indoor environment monitoring unit 160 may connect to a predetermined external cloud server to upload indoor environment information via the communication controller 120 or may share the indoor environment information with all the communication terminals connected to the network access apparatus 100. That is, it is possible that the indoor environment information obtained by the indoor environment monitoring unit 160 is provided and used to various devices via the communication function of communication controller 120.

In addition, the indoor environment monitoring unit 160 may obtain the time for which a user stays indoors based on whether there is a communication terminal that is connected to the communication unit 110 and the type of communication terminal, and then it may calculate and provide an amount of exposure to pollutants based on the time and length of the visit and the indoor environment information. For example, it is possible for the indoor environment monitoring unit 160 to easily determine who is exposed to what kinds of pollutants for how long by continuously monitoring the degrees of pollution of indoor environment while a specific user stays indoors and to calculate and provide an accumulated amount of pollution or a degree of danger to which a user is exposed based on the determination for each user.

The power supply unit 130 may generate and supply the operating power of the indoor environment monitoring unit 160 and a sensing unit 150 as well as the communication controller 120.

The data input output unit 140 may equip one or more data output devices, such as a display panel, a light-emitting diode, and a speaker, and audio-visually inform an operation status of the communication controller 120 via the data output device. In addition, the indoor environment information may be provided in an audio-visual way under the control of communication controller 120.

The data input output unit 140 may further equip various input devices of a user control value such as a button, a switch, a scroll bar, and a touch indoor environment sensor. Via the input devices, the data input output unit 140 may receive a manual input of information on a network control value, a sensor control value, and a user situation, an indoor environment sensor operating schedule, etc.

Figure 2:
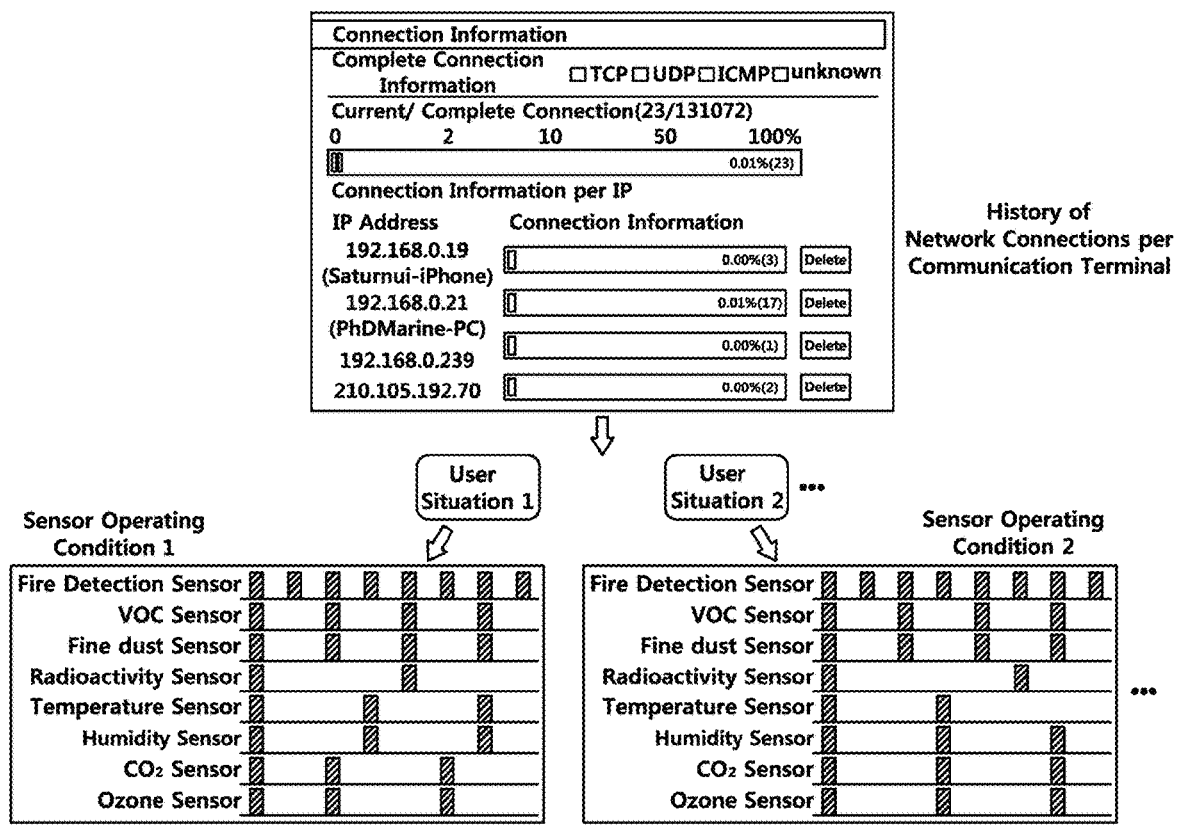
FIGS. 2 and 3 are diagrams illustrating a process of controlling a sensing cycle for low power operation according to an example of the present disclosure.
Figure 3:
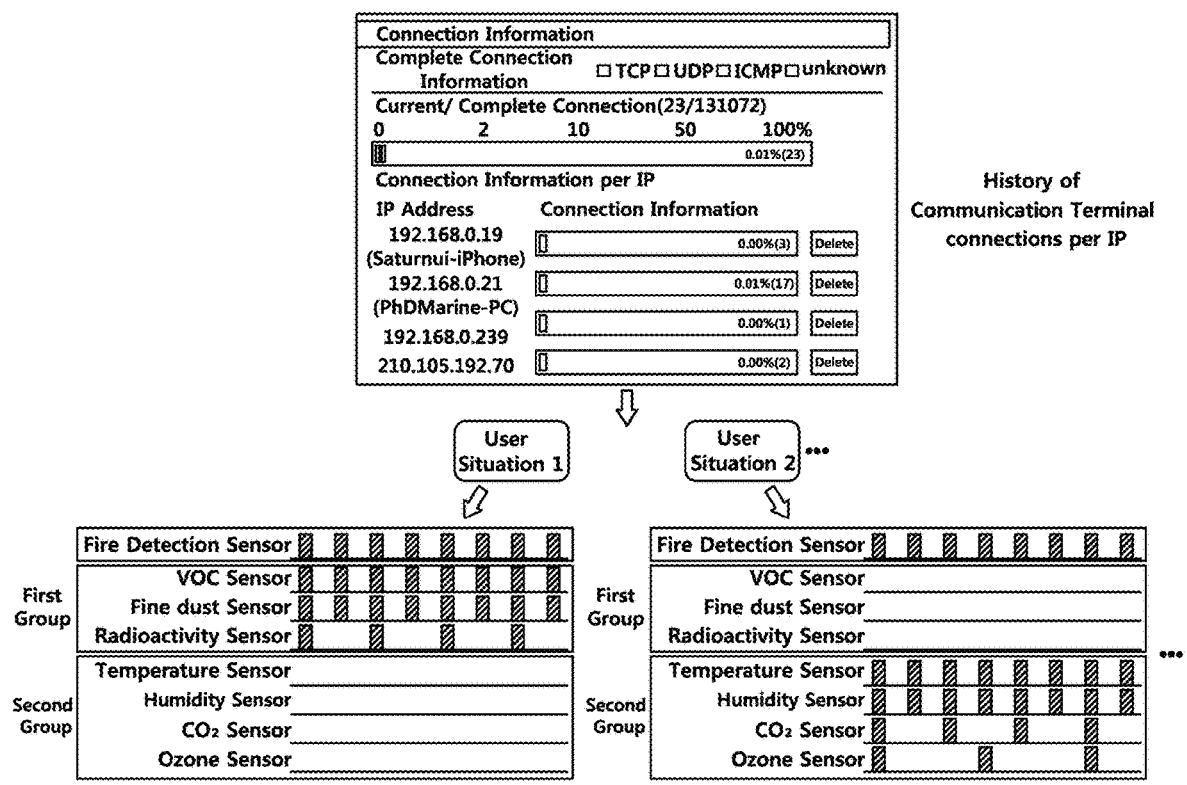

FIGS. 2 and 3 are diagrams illustrating a process of controlling a sensing cycle for low power operation according to an example of the present disclosure.

The indoor environment monitoring unit 160 of the present disclosure may in advance set and have information on a condition for determining a user situation to infer the user situation that corresponds to a history of network connections per communication terminal and information on a condition for operating an indoor environment sensor that corresponds to each user situation.

As illustrated in FIG. 2, the indoor environment monitoring unit 160 of the present disclosure may receive information on whether there is a communication terminal that is connected to the communication unit 110 or the type of the communication terminal, that is, a history of network connections per communication terminal, from the communication controller 120 and may obtain a current user situation that corresponds to the history of network connections per communication terminal via the analysis of the condition for determining a user situation. The indoor environment monitoring unit 160 may also obtain each sensing cycle of indoor environment sensor and adjust the each sensing cycle based on the condition for operating an indoor environment sensor to match the each sensing cycle to a current user situation.

As illustrated in FIG. 3, the present disclosure describes that a plurality of indoor environment sensors 151 to 158 may be grouped into numerous groups and each sensing cycle of the plurality of indoor environment sensors 151 to 158 may be controlled by group based on information such as user situation, etc.

For example, the VOC sensor 152, the fine dust sensor 153, and the radioactivity sensor 154 may be grouped into a first group, and the temperature sensor 155, the humidity sensor 156, the ozone sensor 157, and the $CO_2$ sensor 158 may be grouped into a second group. If a user situation is the case where an air pollution occurs, only indoor environment sensors of the first group are activated. If a user situation is the case of normal life, only indoor environment sensors of the second group are activated. In detail, in the case of occurrence of an air pollution, a degree of air pollution resulting from pollutants may be measured and informed via the indoor environment sensors of first group; in the case of normal life, an amount of oxygen or carbon dioxide, etc. of indoor residential environment may be monitored via the indoor environment sensors of second group.

An indoor environment sensor that has to be operated all the time, such as the fire detection sensor 151, may be excluded from the process of adjusting the process of adjusting each sensing cycle of indoor environment sensors.

In addition, in the present disclosure, it is possible to manually enter an input of one of information on user situations and information on an indoor environment sensor operating schedule via the data input output unit 140. In this case, it is possible to change each sensing cycle of the plurality of indoor environment sensors 151 to 158 by setting a manually entered input as the top priority.

However, as a result of inferring user situations, an information conflict may occur if at least two inputs are simultaneously inputted among the user situation and the indoor environment sensor operating schedule that are manually inputted. According to the present disclosure, it is possible to individually set priorities of the user situation and the indoor environment sensor operating schedule in advance, and also to select a piece of information that will be used for adjusting sensing cycles from a plurality of pieces of information inputted at the same time.

In the above, the case of controlling each sensing cycle of indoor environment sensors by going through the step of determining user situations based on the information on whether there is a communication terminal that is connected to the communication unit 110 or the type of the communication terminal is described. It is certainly understood that it is also possible to directly control each sensing cycle of indoor environment sensors based on the information on whether there is a communication terminal that is connected to the communication unit 110 or the type of the communication terminal.

In this case, the sensing cycles per sensor that are based on the information on whether there is a communication terminal that is connected to the communication unit 110 or a type of the communication terminal, the user situations that are based on the information on whether there is a communication terminal that is connected to the communication unit 110 or a type of the communication terminal, and the sensing cycles per sensor that are based on the user situation may be values that are randomly set by a user; however, depending on circumstances, they may be values that are learned by Machine Learning, Deep Learning, etc.

Figure 4:
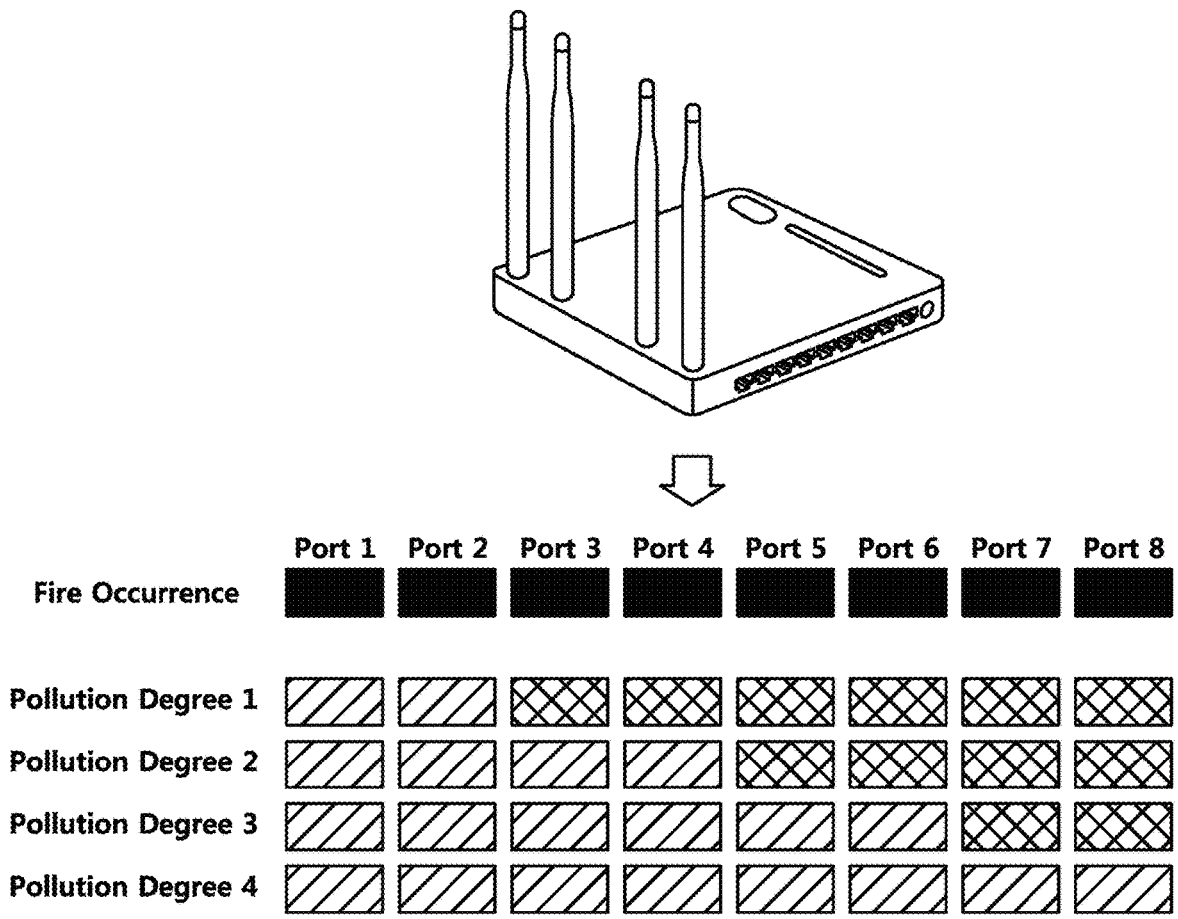
FIG. 4 is a diagram illustrating a method for audio-visually providing a user with indoor environment information according to an example of the present disclosure.

FIG. 4 is a diagram illustrating a method for audio-visually providing a user with indoor environment information according to an example of the present disclosure.

The network access apparatus according to the present disclosure may be one of a wireless router, a wired router, an access point, and a set-top box, these devices may basically equip a light-emitting diode to visually provide an operating status of the network access apparatus and a speaker to auditorily provide an operating status of the network access apparatus.

As illustrated in FIG. 4, if the network access apparatus is implemented as an access point, the access point may equip a plurality of wired/wireless ports in which status LEDs are individually formed. The network access apparatus may be capable of displaying information on whether a fire breaks out, degrees of indoor air pollution, etc. by changing the color of each status LED formed in wired/wireless ports.

In detail, if the occurrence of a fire is sensed, all colors of the status LEDs are changed to red, and indoor environment information may be visually provided by changing, based on the pollution degree of indoor air quality, the colors of a plurality of status LEDs according to a predetermined pattern (for example, colors of status LEDs are changed sequentially by using a thermometer code. Of course, it is also possible to selectively play various alarm sounds that correspond to indoor environment information via a speaker located in the access point.

Figure 5:
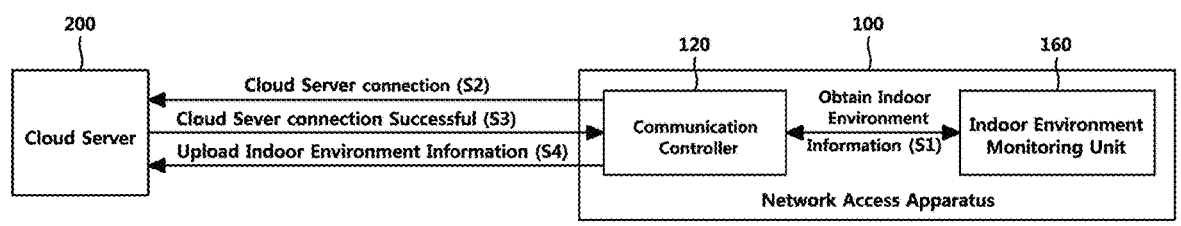
FIG. 5 is a diagram illustrating a method for saving and managing indoor environment information via an external cloud server according to an example of the present disclosure.

FIG. 5 is a diagram illustrating a method for saving and managing indoor environment information via an external cloud server according to an example of the present disclosure.

As the network access apparatus 100 is turned on, the communication controller 120 and indoor environment monitoring unit 160 may be activated and the indoor environment monitoring unit 160 may obtain indoor environment information via a plurality of indoor environment sensors 151 to 158 (S1).

The communication controller 120 may connect to a cloud server 200 based on a predetermined piece of cloud server connection information (S2, S3) and upload indoor environment information obtained via the indoor environment monitoring unit 160 to the cloud server 200 (S4).

Then, the cloud server 200 may map the identification information of the network access apparatus 100 or the user account information to the indoor environment information to store and manage the information. This may be useful for a user or third user to search for and browse the necessary information in the future.

In addition, the cloud server 200 may collect and manage information on communication terminals using the same user account, and the indoor environment information may be automatically shared to a plurality of communication terminals based on the information of user account.

Figure 6:
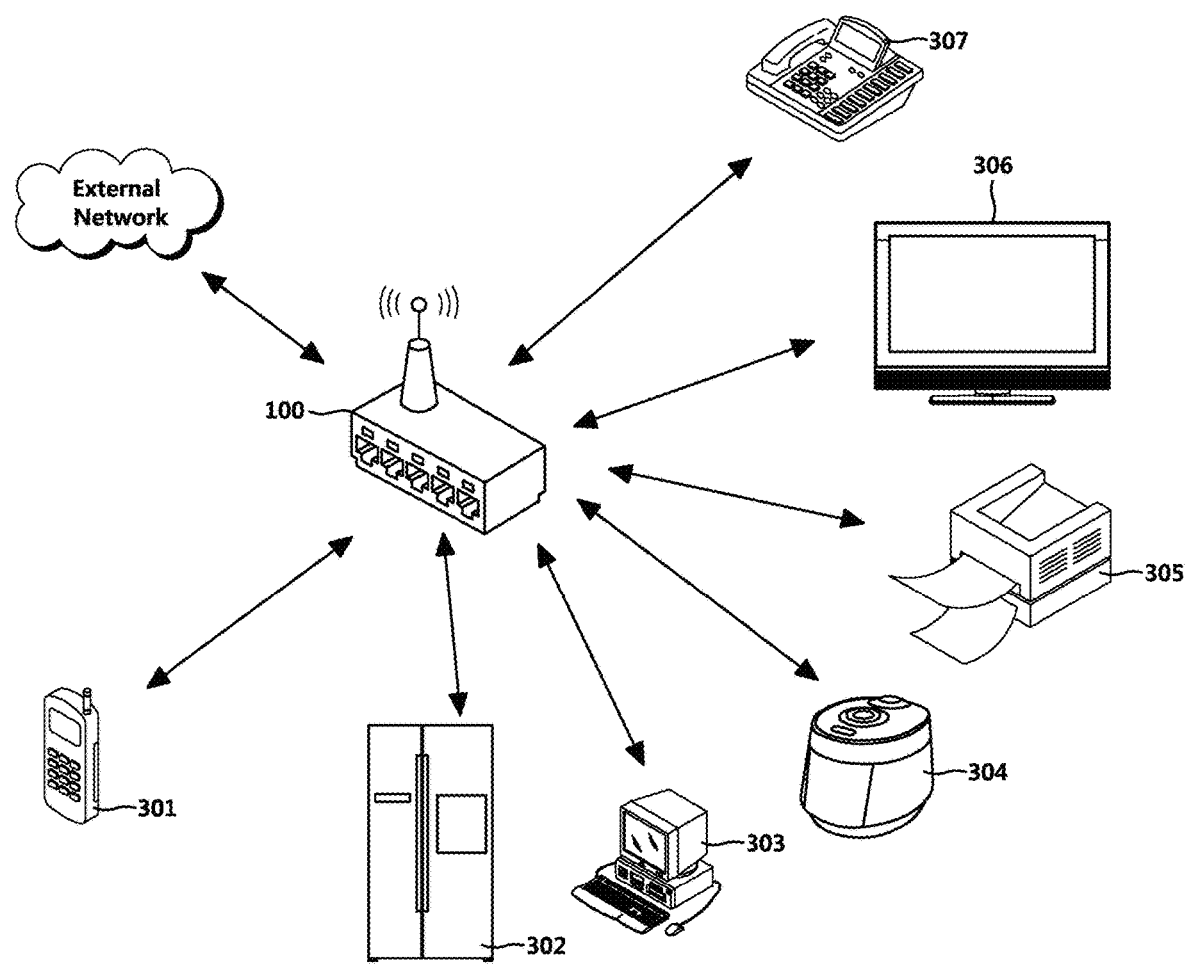
FIG. 6 is a diagram illustrating a method for sharing indoor environment information with communication terminals in a Local Area Network according to an example of the present disclosure.

FIG. 6 is a diagram illustrating a method for sharing indoor environment information with communication terminals in a Local Area Network according to an example of the present disclosure.

Communication terminals connected to the network access apparatus of the present disclosure may basically establish a communication channel with the network access apparatus to send and receive all kinds of data, and the communication terminals may be devices where an external network, such as the Internet, is available. Therefore, a communication terminal connected to network access apparatus may connect to every kind of application store to download and install an application execution file for monitoring an indoor environment.

If the connection of a communication terminal is detected, the network access apparatus 100 of the present disclosure, in particular, the communication controller 120, may activate operations of an application installed on the corresponding communication terminal and then push indoor environment information obtained by the indoor environment monitoring unit 160. That is, the network access apparatus may establish a Local Area Network and share indoor environment information with all the communication terminals on the Local Area Network, which enables a user to easily search for and browse various indoor environment information via his or her current communication terminal as soon as the user enters inside buildings.

In this case, the communication terminal may be all types of terminals with a LAN communication module, such as a smart phone 301, a smart refrigerator 302, a desk top 303, a smart rice cooker 304, a printer 305, a smart TV 306, a wired telephone 307, a laptop, a tablet PC.

In the above description, the case that the communication controller 120 and the indoor environment monitoring unit 160 are implemented as individual hardware device is described. However, depending on circumstances, as illustrated in FIG. 7, they may be implemented to be incorporated into a single hardware.

Figure 7:
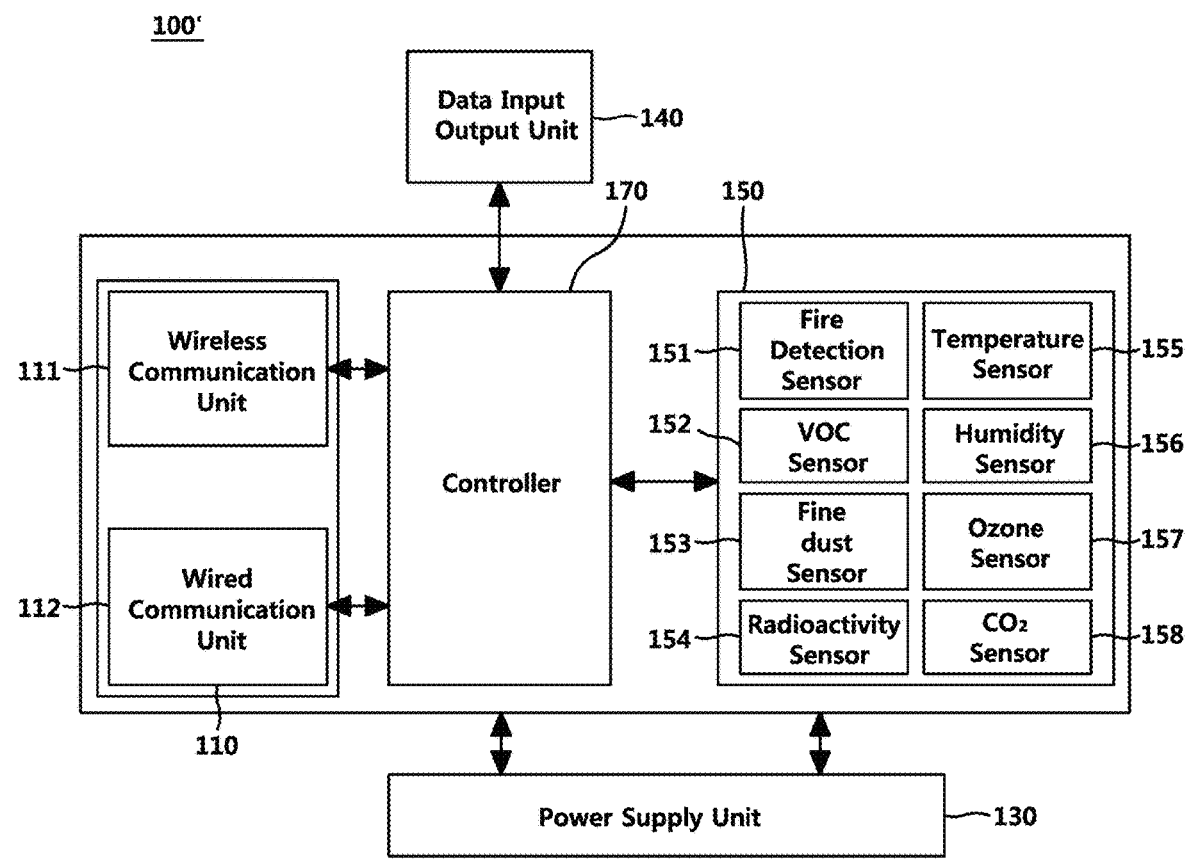
FIG. 7 is a diagram illustrating a network access apparatus according to another example of the present disclosure.

Referring to FIG. 7, network access apparatus 100' according to another example of the present disclosure may be implemented to include a communication unit 110, a power supply unit 130, a data input output unit 140, and a sensing unit 150, similar to FIG. 1, but a communication controller 120 and an indoor environment monitoring unit 160 of FIG. 1 may be implemented to be incorporated into a single hardware, that is a controller 170.

Figure 8:
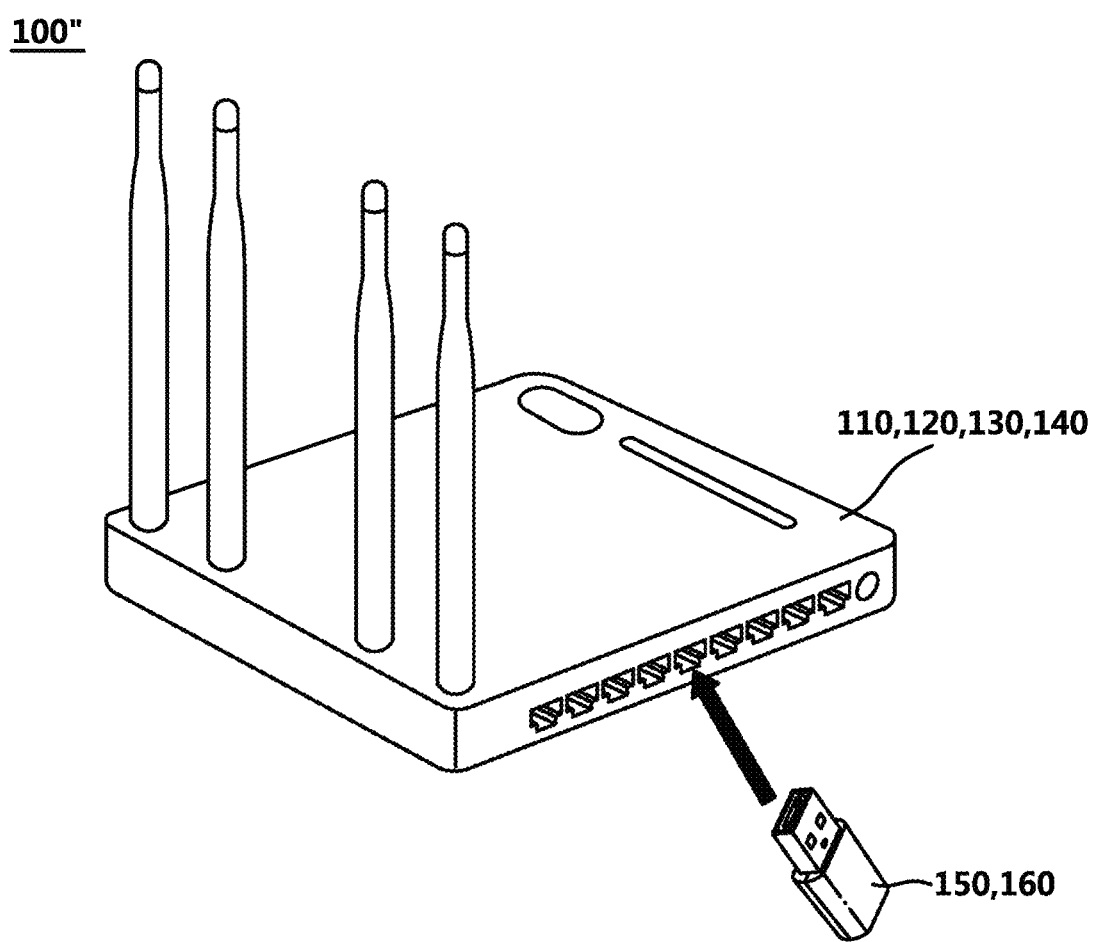
FIG. 8 is a diagram illustrating a network access apparatus according to another example of the present disclosure.

In addition, network access apparatus 100" according to another example of the present disclosure may equip a sensing unit 150 and an indoor environment monitoring unit 160 that are implemented as the form of USB Dongle that is accessible to a wired port of the network access apparatus, as illustrated in FIG. 8. The sensing unit 150 and the indoor environment monitoring unit 160 implemented as the form of USB Dongle are connected to the network access apparatus and their operations are activated by receiving an operating power of the network access apparatus. They may also perform the operation of monitoring and providing an indoor environment, described above, by using the function of communication and the function of data input output of the network access apparatus.

Figure 9:
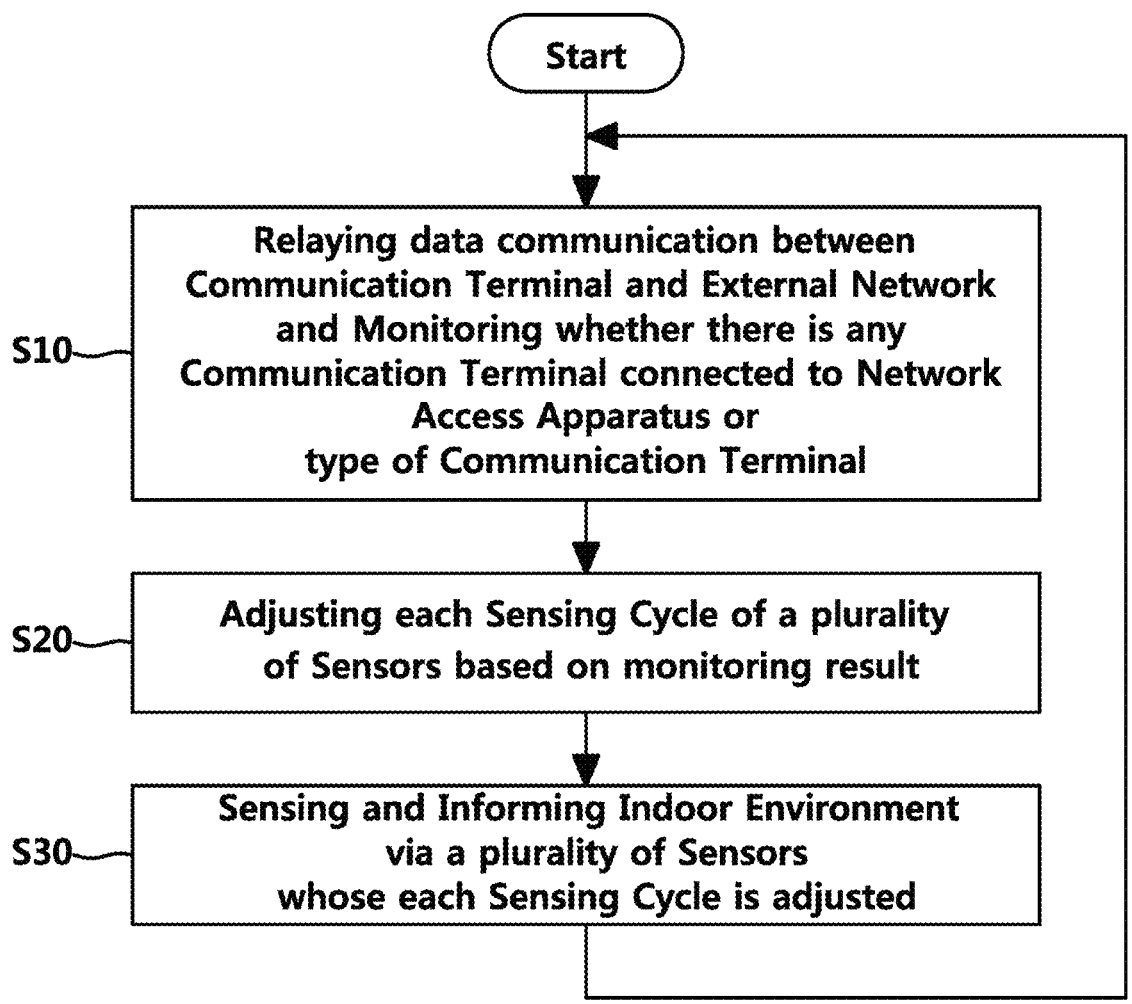
FIG. 9 is a diagram illustrating a method for monitoring an indoor environment according to another example of the present disclosure.

FIG. 9 is a method for monitoring an indoor environment according to an example of the present disclosure.

As illustrated in FIG. 9, the method for monitoring an indoor environment may include relaying data communication between a communication terminal and an external network, monitoring a history of network connections per communication terminal (that is, information on whether there is any communication terminal connected to the network access apparatus or the type of the communication terminal) (S10), adjusting each sensing cycle of a plurality of indoor environment sensors based on the result of the monitoring in step S10 (S20), and sensing and informing indoor environment via the plurality of indoor environment sensors whose sensing cycles are adjusted (S30).

In addition, in the step of adjusting sensing cycle (S20), it is possible to adjust each sensing cycle of the plurality of indoor environment sensors by inferring user situations based on the history of network connections per communication terminal. In addition, it is possible to adjust each sensing cycle of the plurality of indoor environment sensors by considering one of a sensor control value and an indoor environment sensor operating schedule that are manually inputted by a user. Further, it is possible to group the plurality of indoor environment sensors into numerous groups and then adjust the sensing cycles of the indoor environment sensors by group.

The step of sensing and informing indoor environment (S30), as described above, may audio-visually provide a result of sensing indoor environment via a data input output unit formed in the network access apparatus, or may automatically upload the result to a predetermined cloud server or share it to all communication terminals that are connected to the network access apparatus. Accordingly, the result of sensing indoor environment may be used in various ways.

The network access apparatus installed indoors, such as in the house, in the office, in a building, of the present disclosure, may further execute the function of monitoring an indoor environment, which makes it possible that the cost and time that are consumed for the establishment of an indoor environment monitoring system is the least.

The described above features, structures, effects, etc. are included in at least one of examples according to the present disclosure, and are not limitedly included in only one example. The features, structures, effects suggested by each example may be modified or arranged by a person having ordinary skill in the art.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. Accordingly, the scope of the present disclosure shall be determined only according to the attached claims.

What is claimed is:

1. A network access apparatus for indoor environment monitoring comprising:
   a communication unit that supports a connection between a communication terminal and an external network;
   a communication controller that relays a data communication between the communication terminal and the external network and monitors whether the communication terminal is connected to the communication unit;
   a sensing unit that includes a plurality of indoor environment sensors;
   an indoor environment monitoring unit that adjusts each sensing cycle of the plurality of indoor environment sensors based on a result of monitoring of the communication controller and generates and outputs indoor environment information via the plurality of indoor environment sensors whose each sensing cycle is adjusted; and
   a power supply unit that generates and supplies an operating power of the communication controller, indoor environment monitoring unit, and sensing unit,
   wherein the communication controller provides a user or an external device with the indoor environment information of the indoor environment monitoring unit,
   wherein the indoor environment monitoring unit includes information for determining a type of the communication terminal and information on a condition for operating each indoor environment sensor that corresponds to a user situation,
   wherein the indoor environment monitoring unit obtains each sensing cycle of each said indoor environment sensor corresponding to the user situation based on the condition for operating each said indoor environment sensor.

2. The apparatus of claim 1, wherein the indoor environment monitoring unit that groups the plurality of indoor environment sensors into a plurality of groups and controls each said sensing cycle of the plurality of indoor environment sensors by group.

3. The apparatus of claim 1, wherein the indoor environment monitoring unit that turns off all the plurality of indoor environment sensors or increases each said sensing cycle to a predetermined value if there is no communication terminal that is connected to the communication unit or if no connection history of communication terminal is made within a predetermined time period.

4. The apparatus of any one of claims 1 to 3, wherein each said sensing cycle of the plurality of indoor environment sensors is learnable by Machine Learning or Deep Learning.

5. The apparatus of claim 1, wherein the communication controller further connects to a predetermined cloud server and uploads the indoor environment information of the indoor environment monitoring unit to the predetermined cloud server.

6. The apparatus of claim 1, wherein the communication controller further shares the indoor environment information of the indoor environment monitoring unit with the communication terminal that is connected to the communication unit.

7. The apparatus of claim 1, wherein the communication controller further calculates and provides, based on the indoor environment information and a result of monitoring of the communication controller, an amount of exposure to pollutants for each user visiting a place in which the network access apparatus is installed.

8. The apparatus of claim 1, further comprising a data input output unit that provides, in an audio-visual way, information on an operation status of the communication controller and the indoor environment information of the indoor environment monitoring unit via at least one of a display panel, a light-emitting diode, and a speaker.

9. The apparatus of claim 8, wherein the data input output unit receives a manual input of a user control value via at least one of a button, a switch, a scrollbar, and a touch indoor environment sensor, and
   wherein the indoor environment monitoring unit further adjusts, if the user control value is inputted via the data input output unit, each said sensing cycle of the plurality of indoor environment sensors based on the user control value,
   wherein the user control value is one of a sensor control value, a user situation, and an indoor environment sensor operating schedule.

10. The network access apparatus of claim 1, comprising one of a wireless router, a wired router, an access point, and a set-top box.

11. The apparatus of claim 10, wherein the sensing unit and the indoor environment monitoring unit are implemented as a Universal Serial Bus (USB) Dongle that is capable of being connected to a wired port that is formed in one of the wireless router, the access point, and the set-top box.

12. A network access apparatus for indoor environment monitoring comprising:
    a communication unit that supports a connection between a communication terminal and an external network;
    a sensing unit that includes a plurality of indoor environment sensors;
    a controller that relays a data communication between the communication terminal and the external network and monitors whether the communication terminal is connected to the communication unit and, then, adjusts each sensing cycle of the plurality of indoor environment sensors based on a result of the monitoring and generates and outputs indoor environment information via the plurality of indoor environment sensors whose each sensing cycle is adjusted; and
    a power supply unit that generates and supplies an operating power of the controller and the sensing unit,
    wherein the controller includes information for determining a user situation and information on a condition for operating the indoor environment sensor that corresponds to said user situation,
    wherein the controller obtains each sensing cycle of each said indoor environment sensor corresponding to the user situation based on the condition for operating each said indoor environment sensor.

13. The apparatus of claim 12, wherein the controller groups the plurality of indoor environment sensors into a plurality of groups and controls the each sensing cycle of the plurality of indoor environment sensors by group.

14. The apparatus of claim 12, wherein the indoor environment monitoring unit that turns off all the plurality of indoor environment sensors or increases each sensing cycle to a predetermined value if there is no communication terminal that is connected to the communication unit or if no connection history of communication terminal is made within a predetermined time period.

15. The apparatus of any one of claims 12 to 14, wherein the each sensing cycle of the plurality of indoor environment sensors is learnable by Machine Learning or Deep Learning.

16. The apparatus of claim 12, wherein the controller further connects to a predetermined cloud server, and uploads the indoor environment information to the predetermined cloud server.

17. The apparatus of claim 12, wherein the controller further shares the indoor environment information with the communication terminal that is connected to the communication unit.

18. The apparatus of claim 12, wherein the controller calculates and provides, based on the indoor environment information and whether there is a communication terminal that is connected to the communication unit or a type of the communication terminal, an amount of exposure to pollutants for each user visiting a place in which the network access apparatus is installed.

19. The apparatus of claim 12, further comprising a data input output unit that provides, in an audio-visual way, information on an operation status of the communication controller and the indoor environment information of the indoor environment monitoring unit via at least one of a display panel, a light-emitting diode, and a speaker.

20. The apparatus of claim 19, wherein the data input output unit receives a manual input of a user control value via at least one of a button, a switch, a scrollbar, and a touch indoor environment sensor, and
   wherein the controller further adjusts, if the user control value is inputted via the data input output unit, each sensing cycle of the plurality of indoor environment sensors based on the user control value,
   wherein the user control value is one of a sensor control value, a user situation, and an indoor environment sensor operating schedule.

21. The network access apparatus of claim 12, comprising one of a wireless router, a wired router, an access point, and a set-top box.

22. A method for indoor environment monitoring of a network access apparatus comprising:
   relaying a data communication between a communication terminal and an external network and monitoring whether the communication terminal is connected to the network access apparatus;
   obtaining a user situation by analyzing the information on whether the communication terminal is connected to the network access apparatus,
   obtaining each sensing cycle of an indoor environment sensor corresponding to the user situation and a previously stored information based on a condition on operating an indoor environment sensor;
   adjusting each sensing cycle of a plurality of the indoor environment sensors based on whether the communication terminal is connected to the network access apparatus; and
   sensing and informing an indoor environment via the plurality of indoor environment sensors whose each sensing cycle is adjusted.

* * * * *